United States Patent [19]
Seidel et al.

[11] Patent Number: 5,549,519
[45] Date of Patent: Aug. 27, 1996

[54] METHOD FOR CONTROL OF AN AUTOMATIC TRANSMISSION OF A MOTOR VEHICLE

[75] Inventors: Willi Seidel, Eberdingen-Hochdorf; Joseph Petersmann, Wimsheim, both of Germany

[73] Assignee: Dr. Ing. h.c.F. Porsche AG, Germany

[21] Appl. No.: 170,183

[22] PCT Filed: May 22, 1992

[86] PCT No.: PCT/EP92/01157

§ 371 Date: Dec. 21, 1993

§ 102(e) Date: Dec. 21, 1993

[87] PCT Pub. No.: WO93/00534

PCT Pub. Date: Jan. 7, 1993

[30] Foreign Application Priority Data

Jun. 21, 1991 [DE] Germany ............ 41 20 566.9

[51] Int. Cl.⁶ .................................................. F16H 61/16
[52] U.S. Cl. .................... 477/125; 477/121; 477/155; 364/426.01
[58] Field of Search ............... 477/96, 121, 125, 477/155; 364/426.01, 426.03

[56] References Cited

U.S. PATENT DOCUMENTS 5,025,684  6/1991  Stehle et al. ................ 477/155
5,097,725  3/1992  Sawa ............................ 477/155
5,362,286  11/1994 Satoh et al. ................... 477/115

FOREIGN PATENT DOCUMENTS 3341652  12/1987  Germany.
3922040  1/1991   Germany.
3922051  1/1991   Germany.

Primary Examiner—Charles A. Marmor
Assistant Examiner—Peter Kwon
Attorney, Agent, or Firm—Evenson, McKeown, Edwards & Lenahan P.L.L.C.

[57] ABSTRACT

A method for control of a preferably electro-hydraulically activated automatic transmission of a motor vehicle equipped with an internal combustion engine provides for prevention of upshifting, i.e. reduction in translation in and before a curve. The upshift prevention is initiated if pressure is removed quickly from the gas pedal in idle operation. The upshift prevention is cancelled if the vehicle does not drive through a curve after elapse of a certain time period after traction operation is recognized. If idle operation is again recognized during elapse of the time period, the upshift prevention is maintained for another time period. After termination of the upshift prevention, step by step adjustment of the gear level to the value determined by the shifting characteristic field takes place.

18 Claims, 5 Drawing Sheets

– 5,549,519 –

METHOD FOR CONTROL OF AN AUTOMATIC TRANSMISSION OF A MOTOR VEHICLE

BACKGROUND AND SUMMARY OF THE INVENTION

The invention relates to a method of controlling an automatic transmission of a motor vehicle which prevents shifting of the transmission in response to defined operating conditions of the vehicle as known from DE-39 22 040 A1.

Conventional automatic transmission controls of motor vehicles powered by internal combustion engines generally initiate shifting into a higher gear (reduction in translation) if the amount of force exerted on the gas pedal is reduced. However, this is not always desirable when driving through a curve or when braking, since such changes in load could possibly result in unsafe driving conditions or one or more reductions in gear when the motor vehicle accelerates again, due to greater force on the gas pedal.

From German patent document DE-33 41 662 C1, it has become known in connection to avoid this upshifting in a curve by determining the lateral acceleration of the motor vehicle. However, this measure only makes it possible to avoid upshifting in a curve.

In order to prevent upshifting even when approaching a curve, in targeted manner, the method for control of an automatic transmission pursuant to DE-39 22 040 A1 determines the gas pedal change velocity, and a signal to prevent an upshift process is derived if idle mode is detected. Thereupon, upshifting is prevented until traction mode occurs again and a predetermined period of time has elapsed.

In DE-39 22 051 A1, it is additionally provided that this period of time be made dependent on another parameter (driving activity), which is derived from one or a combination of several operational or driving parameters of a motor vehicle and evaluates a driving style of a driver or a prevailing traffic situation.

Proceeding from this state of the art, it is the object of the invention to create a method for control of an automatic transmission of a combination of several operational or driving parameters of a motor vehicle and evaluates a driving style of a driver or a prevailing traffic situation.

Based on this state of the art, it is the object of the invention to provide a method for control of an automatic transmission of a motor vehicle, which is further improved particularly with regard to shifting behavior before curves and while braking.

The object is accomplished according to the invention by activating an upshift prevention mode of the vehicle transmission in response to the entry of the vehicle into an coasting mode. This mode is continued for a preset time period T1 during which if the vehicle again enters the coasting mode, the upshift preventing mode is continued until expiration of a second preset time period T2.

The advantages of the invention primarily consist of the fact that a method for control of an automatic transmission of a motor vehicle is created, in which the shifting behavior, particularly before curves and while braking, is further improved.

By having a renewed delay of upshifting after recognition of a traction mode during the first time period, within which renewed delay upshifting before curves is avoided, the driver of a motor vehicle having a transmission equipped with such a control can temporarily give gas even before a curve, without causing an undesirable upshifting. In this manner, incorrect assessments by the driver with regard to approaching a curve in traction or idle mode are tolerated without negative effects on the overall driving behavior of the motor vehicle.

In a further embodiment of the invention, it is provided that after the end of the prevention of upshifting, large gear jumps (over several gear levels) are avoided, in that these gear levels are carried out step by step, with intermediate elapse of certain additional time periods.

Likewise, automatic downshifting (increase in translation) can also be carried out when braking the motor vehicle, if certain conditions are present; adherence to the conditions thereby guarantees safe operation of the motor vehicle. Thus, particularly monitored factors are that the lateral acceleration is not too high, the motor vehicle does not decelerate too greatly and that the driving speed is not too high, in order to avoid a loss of the longitudinal and lateral guide forces of the wheels of the motor vehicle, in particular.

The braking momentum of the drive (internal combustion) engine, which has a greater effect on the drive wheels after a downshift, can therefore not have a negative effect on the driving behavior of the motor vehicle. In this connection, downshifting takes place in steps, with intermediate elapse of a certain time period in each instance.

Downshifting while braking is preferably initiated if a condition of preventing upshifting is active. The latter is activated in known manner, if the motor vehicle is approaching a curve and the driver no longer depresses the gas pedal.

By downshifting while braking, the braking effect of the drive engine of the motor vehicle in idle mode is reinforced, on the one hand, so that the brake (operational brake) of the motor vehicle is under less stress. On the other hand, in connection with maintaining a certain gear, the driver always has a gear level available in and after a curve, which is the optimum for re-acceleration of the motor vehicle.

Other objects, advantages and novel features of the present invention will become apparent from the following detailed description of the invention when considered in conjunction with the accompanying drawings.

DETAILED DESCRIPTION OF THE DRAWING

Figure 1:
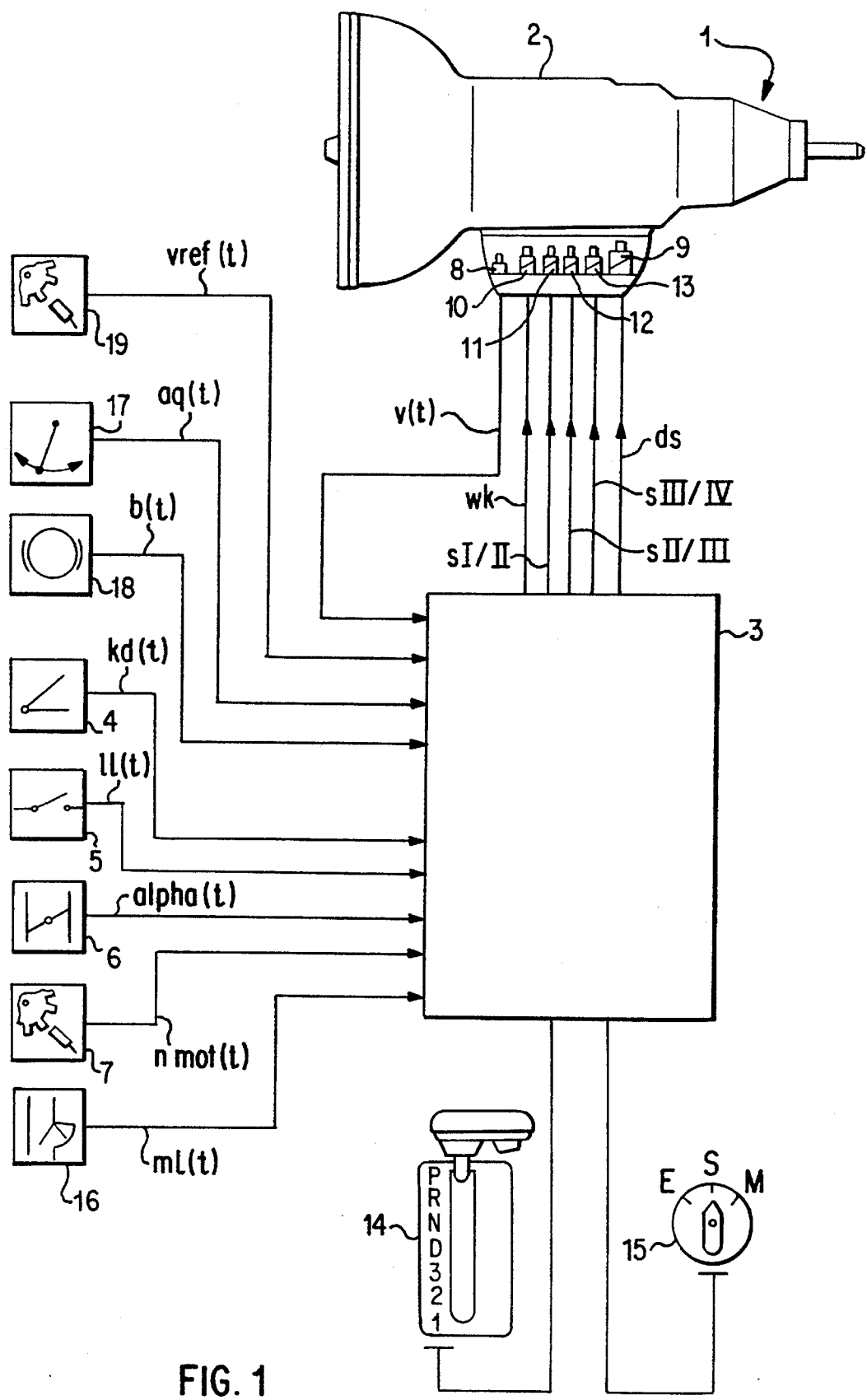
FIG. 1 is a schematic block diagram of an electro-hydraulic control of an automatic transmission of a motor vehicle.

FIG. 1 shows an electro-hydraulic control 1 of an automatic transmission 2 of a motor vehicle, such as that described in Bosch "Technische Berichte" ["Technical Reports"], 7(1983)4 on pages 160 to 166 and in ATZ 85(1983)6 on pages 401 to 405.

In the following, those signals or variables, which change with time, are represented as functions of time f(t).

A control device 3 receives a kick-down signal kd(t) of a kick-down transmitter 4 at the gas pedal of the motor vehicle, as well as of an idle signal ll(t) of a throttle valve switch 5, a throttle valve position alpha(t) of a throttle valve angle transmitter 6 (or an equivalent position transmitter for the position of an element, which influences the output of a drive engine of the motor vehicle, such as a gas pedal or an injection pump lever of a self-igniting diesel internal combustion engine), an engine speed nmot(t) of an engine speed transmitter 7 of an internal combustion engine, not shown, and a driving speed v(t) (gear output speed) of a gear output speed transmitter 8. As a function of these inputs, the control device 3 controls:

- a pressure regulator 9 for the pressure of a hydraulic fluid (signal output ds),
- a first electromagnetic valve 10 to control a converter i.e. a converter bridge coupling (signal output wk),
- a second electromagnetic valve 11 to control a gear level shift between gear levels I and II (signal output sI/II),
- a third electromagnetic valve 12 to control a gear level shift between gear levels II and III (signal output sII/III),
- a fourth electromagnetic valve 13 to control a gear level shift between gear levels III and IV (signal output sIII/IV).

In this connection, the control can usually be influenced by the motor vehicle driver, via a selector lever 14 to preselect the gear positions P, R, N, D, 3, 2, 1. Here, the gear positions that can be used are P (park), R (reverse), N (neutral), D (automatic selection of all four gear levels IV, III, II and I), 3 (automatic selection of the three lowest gears III, II, I), 2 (automatic selection of the two lowest gears II, I) and 1 (locking of the first gear I).

In the transmission described above, a program selector switch 15 is furthermore provided, with which at least two shifting programs (fuel-efficiency shifting program "E" (SKF1), and high-performance shifting program "S" (SKFS) can be manually selected. The two shifting characteristic fields SKFj, control the four gear levels, which are automatically shifted in the driving positions D, III and II. A manual program "M" for direct selection of the four gear levels IV, III, II, I via the selector lever positions D, 3, 2, 1, is also provided.

As an alternative to the program selector switch 15, a control method can also be implemented in the control device 3, which evaluates the driving style of a driver or his actions in response to the traffic situation with regard to control of the motor vehicle over a longer period of time, and derives a driving activity SK(t) (gas pedal activity) from one or more operational, after "driving" insert i.e. driving parameters, as disclosed for example, in German patent documents DE-33 48 652 C2 or DE-39 22 051 A1. On the basis of this driving activity SK(t), one of several shifting programs, i.e. shifting characteristic fields SKFj can then be used to shift the gear levels IV, III, II and I, in accordance with the shifting position of the program selector switch 15.

To implement the method, according to the invention, in addition to the transmitters 4 to 7, further sensors such as an air amount or air mass measuring device 16, which determines an air mass ml(t) supplied to the internal combustion engine, as well as a lateral acceleration transmitter 17 (lateral acceleration aq(t)) and a brake signal transmitter 18 (brake signal b(t)), are also necessary, as is a reference signal transmitter 19, which determines the velocity of the wheels of a non-driven axle, or determines the true velocity of the vehicle relative to the road surface in other known manner (reference velocity vref(t)).

It is particularly desirable that upshifting of such a transmission be avoided if the vehicle is approaching a curve, for example, and the driver is taking his foot off the gas pedal.

As already shown in German patent documents DE-39 22 040 A1 and DE-39 22 051 A1, such curve recognition can be performed, for example, by sensing the time change of the throttle valve position dalpha(t)/dt. (Normally, a driver takes his foot off the gas pedal before a curve—and therefore also lowers the position of the throttle valve—faster than he does under normal conditions, in order to reduce the driving speed v(t), for example.)

Upshifting, which is normally performed by transmission controls of stepped transmissions if the gas pedal position is reduced, (i.e. if the gas pedal is not depressed, is prevented according to the method, as long as the condition of upshift prevention hsv is active, hsv=1. The condition of upshift prevention goes into the active state, hsv=1, if a time change dalpha(t)/dt of the throttle valve position alpha(t) goes below a negative limit -alphag and idle operation is recognized. The condition of upshift prevention hsv returns to the inactive state as soon as traction operation is recognized and after elapse of a first time period T1(SK(t)): hsv=0.

The terms traction operation and idle operation depend on the system being considered. A differentiation can be made between:

The motor vehicle as a total system: Traction operation is understood to be acceleration of the motor vehicle (time change of the driving speed) dv(t)/dt>0, while coasting operation corresponds to deceleration of the motor vehicle dv(t)/dt<0.

The system of coupling (torque converter)/transmission: In traction operation, the input speed of the coupling (of the torque converter) is greater than its output speed/the transmission is tensed in the opposite direction, while in coasting operation, the input speed is less than the output speed/the transmission is tensed in the same direction.

The system of the internal combustion engine: Traction operation means throttle valve position alpha(t)>0 and time change of the engine speed dnmot(t)/dt>0, while in coasting operation the throttle position is alpha(t)=0 or the time change of the engine speed is dnmot/(t)/dt<0.

Figure 2:
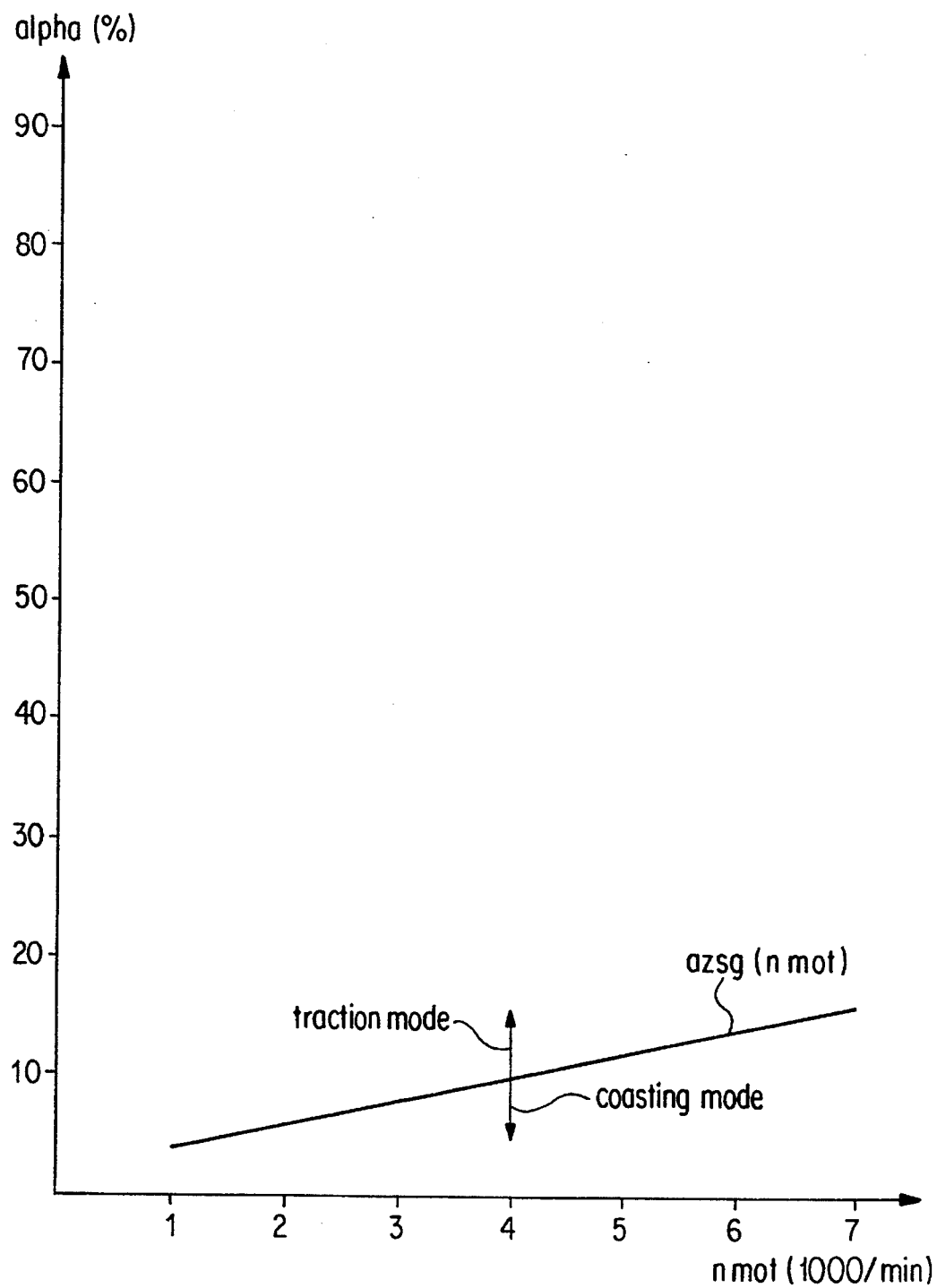
FIG. 2 is a limit characteristic for recognition of idle/traction mode.

With regard to the transmission control and thus also the overall behavior of the motor vehicle, it has proven to be practical to determine the terms traction operation and coasting operation as follows:

Idle operation is recognized if the throttle valve position alpha(t) drops below a limit characteristic line azsg(nmot) dependent on the engine speed, as shown in FIG. 2:
alpha(t)<azsg(nmot).

Traction operation is recognized if both the throttle valve position alpha(t) exceeds the limit characteristic line azsg(nmot) dependent on the engine speed according to FIG. 2, and the time change of the driving speed dv(t)/dt takes on positive values:
alpha(t)>azsg(nmot)∩dv(t)/dt>0.

In the entire patent application, reference is made to the definitions of traction and coasting operation determined in this way.

In accordance with the invention, upshift prevention hsv now remains in the active state, hsv=1, as long as idle mode is again detected during elapse of the first time period T1(SK(t)); upshift prevention hsv=1 remains active until traction mode is again recognized and a time period T2(SK(t)) has again elapsed.

In a further development of the invention, upshifting initiated after elapse of the first or second time period TI(SK(t)), T2(SK(t)) takes place in steps up to that gear level g, which is provided for the instantaneous operating point in the shifting characteristic field set at that time. This has the result that the transmission control does not upshift suddenly by as many as 3 gear levels (in the case of four-speed transmissions) after the upshift prevention has elapsed.

Step by step upshifting always takes place by one gear level at a time, with at least a third time period T3(SK(t)) lying between two shifts.

Furthermore, it can also be provided that step by step downshifting is made possible when braking, preferably starting from active upshifting hsv=1. Step by step downshifting only takes place, however, only if all of the following are true i) an operating brake of the motor vehicle is activated, the brake signal b(t)=1, or alternatively (or in addition), the time change in the driving speed dv(t)/dt is less than a first negative longitudinal acceleration limit albg(g, nmot, t), albg(g, nmot, t)<0:
dv(t)/dt<albg(g, nmot, t), ii) the lateral acceleration detected by the lateral acceleration sensor 17 aq(t) lies below a first defined lateral acceleration limit line aqg1(v(t)) dependent on driving speed:
ag(t)<aqg1(v(t)), iii) the time change in driving speed dv(t)/dt is greater than a second negative longitudinal acceleration limit albbg(nmot, g, SK(t), t)-k(g−1, SK(t))*dv/dt$|_{g-1}$:
dv(t)/dt>albbg(nmot, g, SK(t), t); dv(t)/dt>k(g−1, SK(t))*dv/dt$|_{g-1}$ albg(g, nmot, t), iv) the driving speed v(t) is less than a second driving speed limit vg(g, SK(t), t):
v(5)<vg (g, SK (t), t).

Step by step downshifting always takes place by one gear level at a time, with at least a fourth time period T4(SK(t)) lying between two shifts. Step by step downshifting is carried out up to that gear level g, which is permissible at the instantaneous operating point of the motor vehicle in the shifting characteristic field (SKFj) set at that time (in order to avoid overly high speeds of the internal combustion engine).

The first negative longitudinal acceleration limit albg(g, nmot, t) is dependent on the instantaneous values of the gear level g, which is engaged, and on the engine speed nmot(t), and hereby corresponds to the (negative) longitudinal acceleration dv/dt in each instance (and thus the deceleration) of the motor vehicle rolling on a level road surface in a defined condition (load, tire air pressure, ambient conditions, etc.) with a closed throttle valve alpha=0, at the value pairs of the gear level g, which is currently engaged, and the engine speed nmot(t) in each instance.

Figure 3:
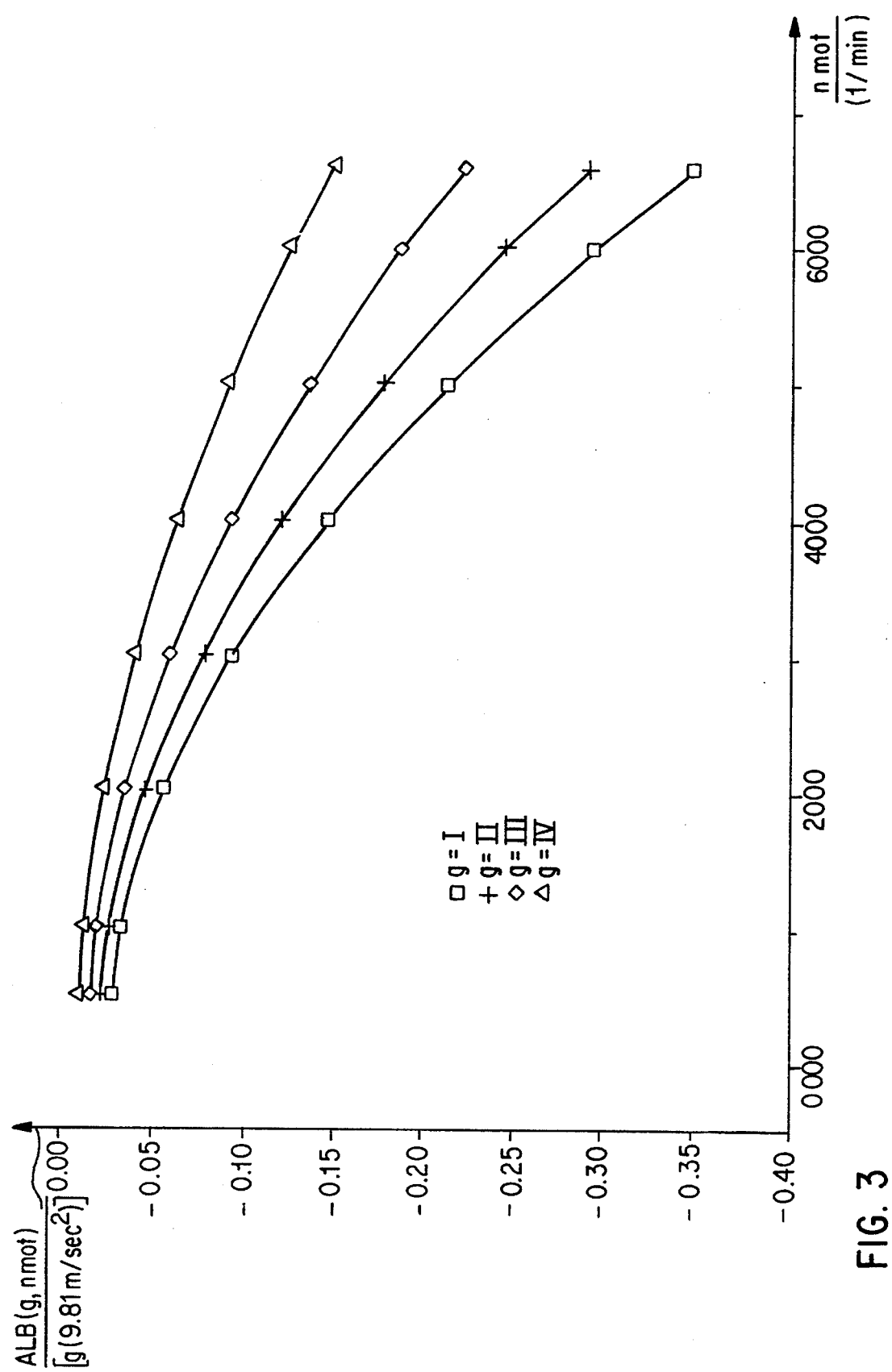
FIG. 3 is a characteristic field for a characteristic field value dependent on engine speed and gear level.

The first negative longitudinal acceleration limit albg(g, nmot, t) is determined from the instantaneous values of these factors, preferably via a first characteristic field ALB(g, nmot): albg(g, nmot, t)=ALB(g, nmot). An example of such a first characteristic field ALB(g, nmot) is shown in FIG. 3. As an alternative to this, the determination of the longitudinal acceleration limits albg(g, nmot, t) can, of course, also take place via a corresponding functional relationship.

The characteristic lines according to FIG. 3 clearly show the dependence of the deceleration values of a motor vehicle with an internal combustion engine on the gear level g and the engine speed nmot(t). In this connection, the individual characteristic lines for the four gear levels I, II, III, IV—without any restriction of the general applicability— each assign a certain value ALB plotted on the vertical axis in the unit g=9.81 . . . meters per second$^2$ (acceleration due to gravity) to a value of the engine speed nmot (in revolutions per minute) plotted on the horizontal axis.

For increasing values of the engine speed nmot(t), the deceleration values become greater, due to the reinforced engine braking effect and the increased rolling resistance (air resistance) of the vehicle. Likewise, the deceleration values increase with a lower gear level g, since the braking momentum of the internal combustion engine has a greater effect on the deceleration rate of the motor vehicle, due to the greater translation.

Figure 4:
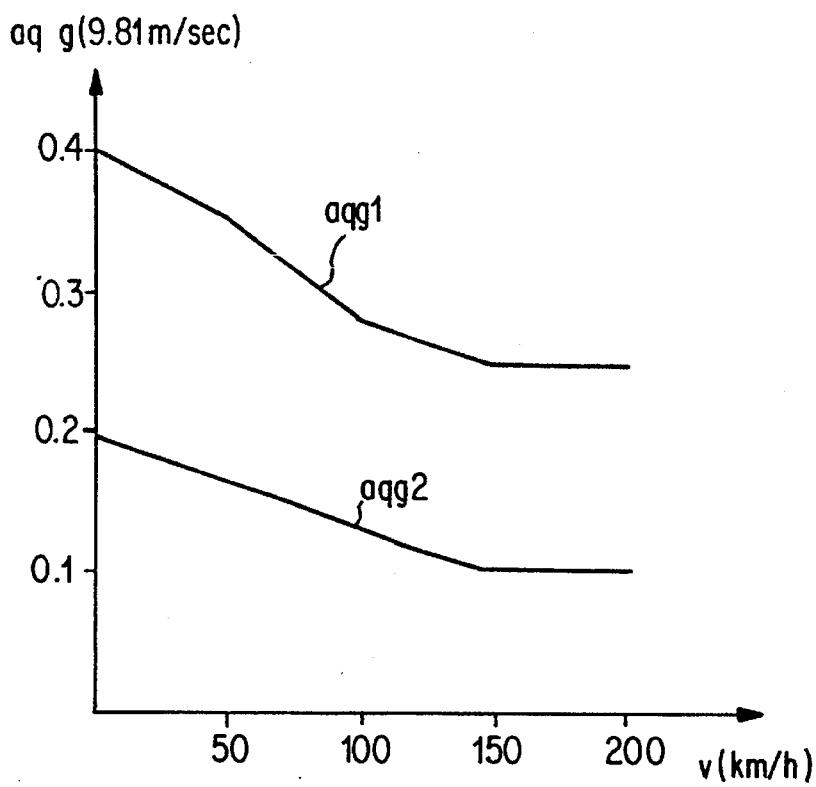
FIG. 4 is a first and a second limit line for lateral acceleration.

In this connection, the first lateral acceleration limit line aqg1(v(t)) is preferably dependent on driving speed and the corresponding limit values derived from it are reduced with an increasing driving speed v(t). A corresponding characteristic line is shown in FIG. 4.

The second negative longitudinal acceleration limit albbg(nmot, g, SK(t))=k(g−1, SK(t))*dv/dt$|_{g-1}$ is determined according to a product of a factor k(g−1, SK(t)) dependent on the gear level, and a value of the longitudinal acceleration dv/dt$|_{g-1}$ to be expected in the next lower gear level g−1, calculated at the current operating conditions of the motor vehicle.

To determine this longitudinal acceleration dv/dt$|_{g-1}$ to be expected in the next lower gear level g−1, the value of the current driving speed v(t) is first used, and the engine speed nmot(t)$_{g-1}$=i(g−1*v(t) to be expected in the next lower gear level g−1 is determined from it. For this, the product of the current value of the driving speed v(t) and the value of the gear translation i(g−1) in the next lower gear level g−1 is formed.

The value of the longitudinal acceleration dv/dt$|_{g-1}$ to be expected in the next lower gear level g−1 is finally determined via the characteristic field ALB(g, nmot) from the next lower gear level g−1 and the value of the engine speed nmot(t)$|_{g-1}$ to be expected in the next lower gear level g−1.

Figure 5:
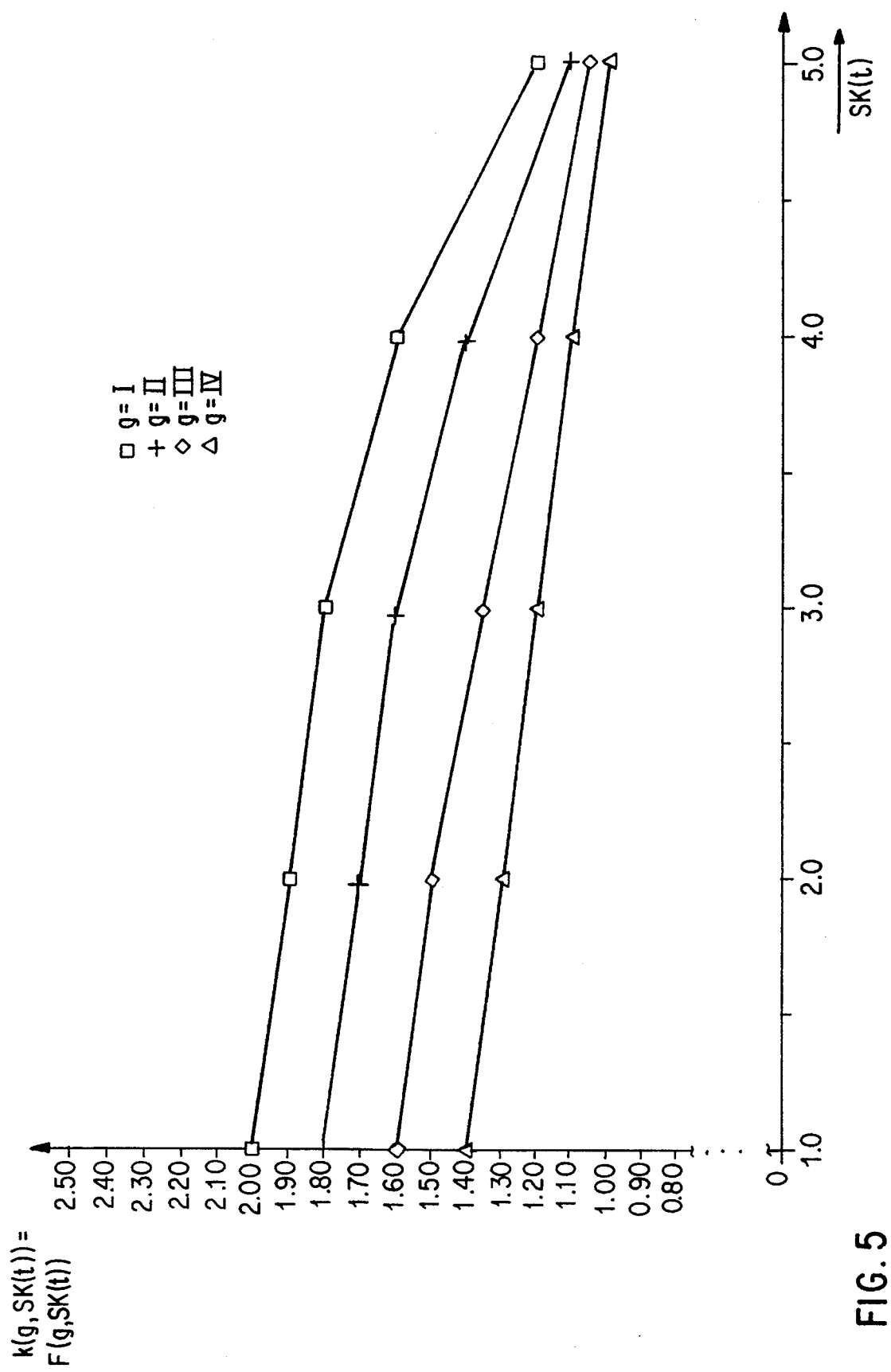
FIG. 5 is a characteristic field for a factor dependent on gear level and driving activity.

The factor k(g−1, SK(t)), which is dependent on the gear level, is determined via a second characteristic field F(g, SK(t)), from the next lower gear level (g−1), k(g−1, SK(t))= F(g, Sk(t)). An example for the second characteristic field is shown in FIG. 5.

The second driving speed limit vg(g, SK(t), t) depends on the gear level g and the driving activity SK(t).

The effect of the individual method steps can be explained as follows:

By monitoring the activation of the operating brake of the motor vehicle (brake signal b=1), or alternatively (or in addition, by checking whether the rate of change in the driving speed dv(t)/dt lies below the first negative longitudinal acceleration limit albg(g, nmot), dv(t)/dt<albg(g, nmot), the driver's wish for greater deceleration, i.e. for downshifting, is determined.

By checking whether the lateral acceleration aq(t) lies below the first defined lateral acceleration limit aqg1(v(t)), the method monitors whether the vehicle is already driving in a curve, with relatively high lateral acceleration aq(t). If such curve driving is present, then downshifting is prevented, so that the contact between wheel and road surface is not lost as a result of the braking effect, which would otherwise increase.

A comparable safety function is represented by the monitoring of whether the value goes below the second negative longitudinal acceleration limit albbg(nmot, g, SK(t)): Here, it is determined whether the expected deceleration of the motor vehicle after a requested downshift would not result in exceeding the adhesion friction limit of the wheels.

For this purpose, a maximum permissible deceleration at a particular time is determined from the deceleration to be expected after downshifting at the current driving conditions, by weighting (multiplication) by the factor k(g−1, SK)t)), which is dependent on gear level, and this is compared with the current vehicle deceleration dv(t)/dt; if the instantaneous deceleration is greater, downshifting is prevented.

In this, the factor k(g−1, SK)t)), which is dependent on gear level, takes into consideration that the second negative longitudinal acceleration limit albbg is less than the first negative longitudinal acceleration limit albg(g, nmot), in other words, must be greater in amount (corresponding to a higher deceleration rate).

By monitoring whether the driving speed limit vg(g, SK(t), t), which is dependent on gear level, is exceeded, additional safety criteria with regard to downshifting at overly high driving speed or prevention of exceeding limits for the speed of rotation of the driving internal combustion ending after downshifting can be fulfilled. These safety criteria are highly vehicle-specific and must therefore be adjusted to every vehicle, so that representation of such a characteristic field is not necessary.

In order to avoid a change in gear level g after approaching a curve or after braking before a curve, the lateral acceleration aq(t) of the vehicle is monitored. The change in gear level g is avoided, or the time periods T1(SK(t)), T2(SK(t)), T3(SK(t)) are set to zero, if the amount of the lateral acceleration (|aq(t)|) exceeds a second lateral acceleration limit line aqg2=f(v(t)) dependent on the driving speed, according to FIG. 4, i.e. as long as a fifth time period T5(SK(t)) has not yet elapsed after the value went below the second lateral acceleration limit line aqg2(v(t)). In this connection, it is evident that the second lateral acceleration limit line aqg2(v(t)) for curve detection lies clearly below the first lateral acceleration limit line aqg1(v(t)), which is used as a safety function.

Furthermore, gear changes, but particularly downshifting can be avoided in coasting operation, and/or the time periods T1(SK(t)), T2(SK(t)), T3(SK(t)) or T5(SK(t)) can be set to zero, if excessive slip occurs at at least one of the wheels of the motor vehicle, or if the contact between at least one wheel of the motor vehicle and the road surface driven on is interrupted.

In this connection, shifting is only permitted if a difference velocity Dv(t)=vref(t)−v(t) between the speed vref(t) of a non-driven axle and the driving speed v(t) detected at a driven axle does not exceed a permissible difference velocity value Dvzul(SK(t)):

Dv(t)<Dvzul(SK(t)).

If the permissible difference velocity value Dvzul(SK(t)) is exceeded, in addition a converter bridge coupling of a transmission equipped with a torque converter can be opened, a holding time Th can be set, during which upshifting cannot be prevented, the gear level g, which is engaged, can be raised by one (upshifting) and downshifting can be prevented, where these functions are reset as soon as traction operation is recognized and positive values of the change in driving speed v(t) are present.

Figure 6:
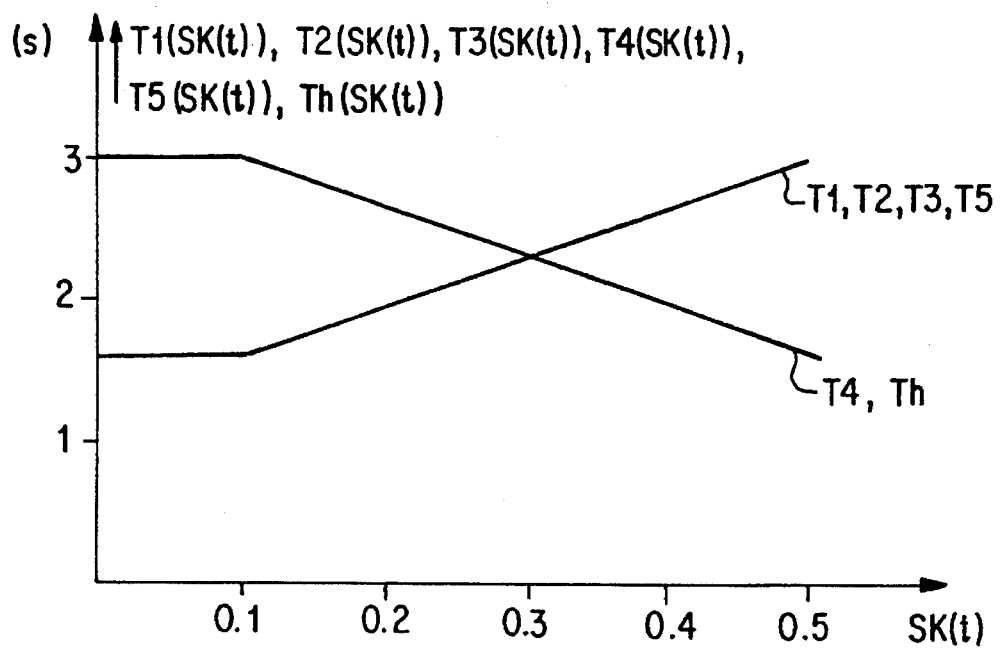
FIG. 6 is a characteristic line, which shows the dependence on time periods as a function of driving activity.

The time periods T1(SK(t)), T2(SK(t)), T3(SK(t)), T4(SK(t)), T5(SK(t)) and Th(SK(t)) can be of the same or of different duration, and at least one of the time periods or the driving speed limit vg(g, SK(t), t) or the factor k(g−1, SK(t)), which is dependent on the gear level, or the permissible difference velocity value Dvzul(SK(t)) can be arbitrarily adjustable, and preferably can be set together with a setting of the shifting characteristic fields SKFj by means of the program selector switch 15 (fuel-efficient shifting characteristic field SKF1), high-performance shifting characteristic field SKF5), in such a way that the time periods T1(SK(t)), T2(SK(t)), T3(SK(t)), T5(SK(t)) and the driving speed limit vg(g, (SK(t)) are greater for more high-performance shifting characteristic fields (driving programs), and the time periods T4(SK(t)), Th(SK(t)), the factor k(g−1, SK(t)), which is dependent on the gear level, and the permissible difference velocity value Dvzul(SK(t)) become smaller (see FIG. 5 and FIG. 6).

If the transmission control provides for automatic adjustment of the shifting characteristic fields to the driving style of the driver or a traffic situation, then at least one of the time periods T1(SK(t)), T2(SK(t)), T3(SK(t)), T4(SK(t)), T5(SK(t)) or Th(SK(t)), or at least the driving speed limit vg(g, Sk(t)) or the factor k(g−1, SK(t)), which is dependent on the gear level, or the permissible difference velocity value Dvzul(SK(t)) can be dependent on the driving activity SK(t), which assesses the driving style of the driver or the traffic situation. With increasing, more performance-oriented driving activity SK(t), the time periods T1(SK(t)), T2(SK(t)), T3(SK(t)), T5(SK(t)) and the driving speed limit vg(g, SK(t)) become greater, and the time periods T4(SK(t)), Th(SK(t)), the factor k(g−1, SK(t)), which is dependent on the gear level, and the permissible difference velocity value Dvzul(SK(t)) become less (see FIG. 5 and FIG. 6).

The driving activity is determined by means of a functional relationship assessed over a longer term by means of the driving style of the driver or his actions in response to the traffic situation, with regard to the control of the motor vehicle (formation of sliding mean from current and past values of a single operational characteristic), or from a single value composed of a number of different operational characteristics of a motor vehicle. This can be done, for example, analogous to the method shown in DE-39 22 051 A1 or DE-33 41 652 C2.

We claim:

1. Method of controlling an automatic transmission of a vehicle with an internal combustion engine having a throttle valve, shifting of gear levels (g) of said automatic transmission being based on shifting characteristics, responsive to at least a position of said throttle valve (alpha(t)), a driving speed of said vehicle (v(t)) and engine speed (nmot(t)) of said internal combustion engine, said method comprising the steps of:

detecting a first entry of said vehicle into a coasting mode wherein a rate of change of position of said throttle valve falls below a negative limit;

activating an upshift prevention state of said automatic transmission in response to said first entry of said vehicle into said coasting mode;

continuing activation of said upshift prevention state until a first time period has elapsed following said first entry of said vehicle into said coasting mode;

detecting a second entry of said vehicle into said coasting mode prior to expiration of said first time period;

in response to said second detected entry of said vehicle into said coasting mode, continuing activation of said upshift prevention state until a second time period has elapsed following said second entry of said vehicle into said coasting mode; and preventing upshifting of said automatic transmission so long as said upshift prevention state is activated.

2. Method according to claim 1, wherein an upshifting of said automatic transmission after elapse of one of said first time period (T1(SK(t))) and second time period (T2(SK(t))) is performed in steps up to a gear level (g) determined by an instantaneous operating point of said vehicle and said shifting characteristics (SKF).

3. Method according to claim 2, wherein said upshifting always takes place one gear level at a time, with at least a third time period (T3(SK(t))) between consecutive upshifts.

4. Method according to claim 3, wherein step by step downshifting takes place when said upshift prevention state is activated if:

an operating brake of the motor vehicle is activated, and a rate of change in the vehicle driving speed (dv(t)/dr) is less than a first negative longitudinal acceleration limit (albg(g,nmot,t)<0), dv(t)/dt<albg(g,nmot,t));

lateral acceleration (aq(t)) detected by a lateral acceleration sensor lies below a first defined lateral acceleration limit curve (aqg1(v(t)), aq(t)<aqg1(v(t));

a rate of change in driving speed (dv(t)/dr) of said vehicle is greater than a second negative longitudinal acceleration limit (albbg(nmot, g, SK(t), t)=k(g−1, SK(t))*dv/dt|$_{g-1}$<0), (dv(t)/dt>albbg(nmot, g SK(t),t); dv(t)/dt>k(g−1, SK(t)*dv/dt|$_{g-1}$); and the vehicle driving speed (v(t)) is less than a first driving speed limit (vg(g, SK(t), t)), (v(t)<vg g, SK(t), t)).

5. Method according to claim 4, wherein downshifting always takes place by one gear level at a time, and at least a fourth time period (T4(SK(t))) is allowed between consecutive upshifts.

6. Method according to claim 4, wherein step by step downshifting takes place up to that gear level (g) which is permissible at the current instantaneous operating point in the shifting characteristic (SKFj).

7. Method according to claim 6, wherein the first negative longitudinal acceleration limit (albg(g, nmot, t)) is dependent on instantaneous values of a gear level (g), which is engaged, and on the engine speed (nmot (t)), and corresponds to a longitudinal acceleration (dv/dt) of the motor vehicle rolling on a level road surface in a defined condition with a closed throttle valve (alpha=0), and corresponding values of a current gear level (g) and engine speed (nmot(t)) in each instance.

8. Method according to claim 7, wherein the first negative longitudinal acceleration limit (albg(g, nmot, t)) is determined based on instantaneous values of the gear level (g) and the engine speed (nmot (t)), and a first characteristic (ALB(g, nmot)), (albg(g, nmot, t))=ALB(g, nmot)).

9. Method according to claim 8, wherein the second negative longitudinal acceleration limit (albbg(nmot, g, SK(t) )=k(g−1, SK(t))*dv/dt|$_{g-1}$<0 is determined according to a product of a factor (k(g−1, SK(t))) dependent on gear level, and a value (dv/dt|$_{g-1}$) of longitudinal acceleration determined from instantaneous value of the vehicle driving speed (v(t)), expected in the next lower gear level (g−1), where an engine speed (nmot (t)$_{g-1}$=(g−1*v (t)) in the next lower gear level (g−1) is determined from a current value of the vehicle driving speed (g−1), and a value assigned to the longitudinal acceleration (dv/dt|$_{g-1}$) in a next gear level (g−1) determined from a next lower gear level (g−1) and a value of the engine speed (nmot(t)|$_{g-1}$ in the next lower gear level (g−1) as determined from the first characteristic field (ALB(g, nmot)).

10. Method according to claim 9, wherein the factor (k (g−1, SK(t))), which is dependent on the gear level, is determined by a second characteristic (k (g−1, SK(t))=F(g, Sk(t))), form a next lower gear level (g−1).

11. Method according to claim 10, wherein said driving speed limit (vg(g, SK(t), t)) depends at least on gear level (g).

12. Method according to claim 11, wherein a change in gear level (g) is avoided, and the time periods T1(SK(t)), T2(SK(t)), T3(SK(t)) are set to zero, if lateral acceleration of the vehicle (laq(t)l) exceeds a second lateral acceleration limit curve (aqg2=f(v(t))) dependent on the driving speed (v(t)), as long as a fifth time period (T5(SK(t))) has not yet elapsed after said lateral vehicle acceleration falls below the second lateral acceleration limit curve (aqg2(v(t))).

13. Method according to claim 12, wherein downshifting is prevented and at least one of the time periods T1(SK(t)), T2(SK(t)), T3(SK(t)) or T5(SK(t)) is set to zero, if slip occurs in at least one of the wheels of the motor vehicle exceeds a set limit, or if contact between at least one wheel of the vehicle and a road surface is interrupted.

14. Method according to claim 12, wherein downshifting is permitted only if a difference (Dv(t)=vref(t)−v(t)) between speed (vref(t)) of a non-driven axle of the vehicle and driving speed of the vehicle (v(t)) detected at a driven axle, does not exceed a permissible difference velocity value (Dvzul(SK(t))), Dv(t)<Dvzul(SK(t))).

15. Method according to claim 14, further comprising the steps that if the permissible difference velocity value (Dvzul(SK(t))) is exceeded:

a converter bridge coupling of a transmission equipped with a torque converter of said vehicle is opened;

a holding time (Th(SK(t))) is set, during which upshifting cannot be prevented;

a currently engaged gear level (g) is raised by one; and downshifting is prevented,
said functions being reset when traction operating is restored and positive values of the rate of change in driving speed of said vehicle (dv(t)/dt>0) are present.

16. Method according to claim 15, wherein at least one of the time periods (T1(SK(t)), T2(SK(t)), T3(SK(t)), T4(SK(t)), T5(SK(t)) and Th(SK(t))), the driving speed limit (vg(g,SK(t),t)), the factor (k(g−1, SK(t))) which is dependent on gear level, and the permissible difference velocity value (Dvzul(SK(t))) can be arbitrarily adjusted, and set together with a setting of shifting characteristic curves (SKFj) for fuel-efficient driving program, shifting characteristic field SKF1 and for high-performance driving program, shifting characteristic field SKF5, so that the time periods (T1(SK(t)), T2(SK(t)), T3(SK(t)), T5(SK(t))) and the limit (vg(g, (SK(t))) become greater for more high-performance driving programs, and the time periods (T4(SK(t)), Th(SK(t))), the factor (k(g−1, SK(t))), which is dependent on the gear level, and the permissible difference velocity value (Dvzul(SK(t))) become smaller.

17. Method according claim 16, wherein at least one of the time periods (T1(SK(t)), T2(SK(t)), T3(SK(t)), T4(SK(t)), T5(SK(t)) and Th(SK(t))), the driving speed limit (vg (g, Sk(t))), the factor (k(g−1, SK(t))) which is dependent on the gear level, or the permissible difference velocity value (Dvzul (SK(t))) is dependent on a driving activity (SK(t)), according to the following steps:

assessing the driver's actions with regard to controlling the motor vehicle with reference to the traffic situation over a longer term;

altering the time periods (T1(SK(t)), T2(SK(t)), T3(SK(t)), T5(SK(t)) and the driving speed limit (vg(g, SK(t))) to become greater with increasing, more performance-oriented driving activity (SK(t)); and altering the time periods T4(SK(t)), Th(SK(t))), the factor (k(g−1, SK(t))) which is dependent on the gear level, and the permissible difference velocity value (Dvzul-(SK(t))) to become less.

18. Method according to claim 17, wherein driving activity (SK(t)) is determined by means of a functional relationship assessing the driver's actions in response to the traffic situation, with regard to the control of the motor vehicle, over a longer term, form one of: current and past values of a single operational characteristic, and a single value composed of a number of different operational characteristics of a motor vehicle.

* * * * *